United States Patent
Ohashi et al.

(10) Patent No.: US 8,294,867 B2
(45) Date of Patent: Oct. 23, 2012

(54) LIQUID CRYSTAL DISPLAY HAVING A TERMINAL PORTION AND A SEALING MEMBER WHEREIN NEITHER A FIRST OR A SECOND SUBSTRATE EXTENDS BEYOND AN OUTER PERIPHERY OF THE SEALING MEMBER ALONG A SIDE OF THE DISPLAY

(75) Inventors: Noriyuki Ohashi, Osaka (JP); Mutsumi Nakajima, Osaka (JP); Kenichi Ishiguro, Osaka (JP); Shohichi Andoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 12/602,694

(22) PCT Filed: Apr. 4, 2008

(86) PCT No.: PCT/JP2008/000883
§ 371 (c)(1),
(2), (4) Date: Dec. 2, 2009

(87) PCT Pub. No.: WO2009/028123
PCT Pub. Date: Mar. 5, 2009

(65) Prior Publication Data
US 2010/0171919 A1    Jul. 8, 2010

(30) Foreign Application Priority Data

Aug. 27, 2007    (JP) ................................. 2007-220049

(51) Int. Cl.
G02F 1/1345    (2006.01)
G02F 1/1339    (2006.01)
C09K 19/52    (2006.01)
(52) U.S. Cl. .......................... 349/149; 349/153; 349/166
(58) Field of Classification Search .................. 349/149, 349/153, 166, 190
See application file for complete search history.

(56) References Cited

U.S. PATENT DOCUMENTS

| | | | |
|---|---|---|---|
| 2002/0080461 A1* | 6/2002 | Karasawa et al. | 359/254 |
| 2006/0139556 A1 | 6/2006 | Ahn et al. | |

FOREIGN PATENT DOCUMENTS

| | | |
|---|---|---|
| CN | 1794048 A | 6/2006 |
| JP | 5-249483 | 9/1993 |
| JP | 2001-75064 | 3/2001 |
| JP | 2004-226654 | 8/2004 |
| JP | 2005-208129 | 8/2005 |
| JP | 2006-98634 | 4/2006 |

OTHER PUBLICATIONS

International Search Report for PCT/JP2008/000883 mailed May 13, 2008.

* cited by examiner

*Primary Examiner* — Mark Robinson
*Assistant Examiner* — Paul Lee
(74) *Attorney, Agent, or Firm* — Nixon & Vanderhye P.C.

(57) ABSTRACT

At least one side of a sealing member is formed on an outer edge of a first substrate, and a common transfer terminal portion is formed along at least a part of the sealing member formed on the outer edge of the first substrate.

5 Claims, 14 Drawing Sheets

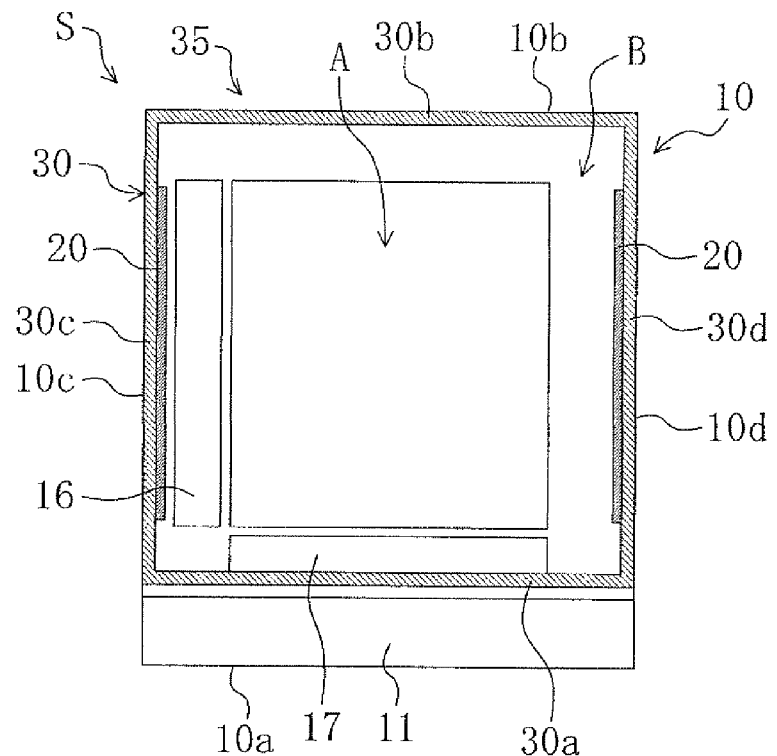
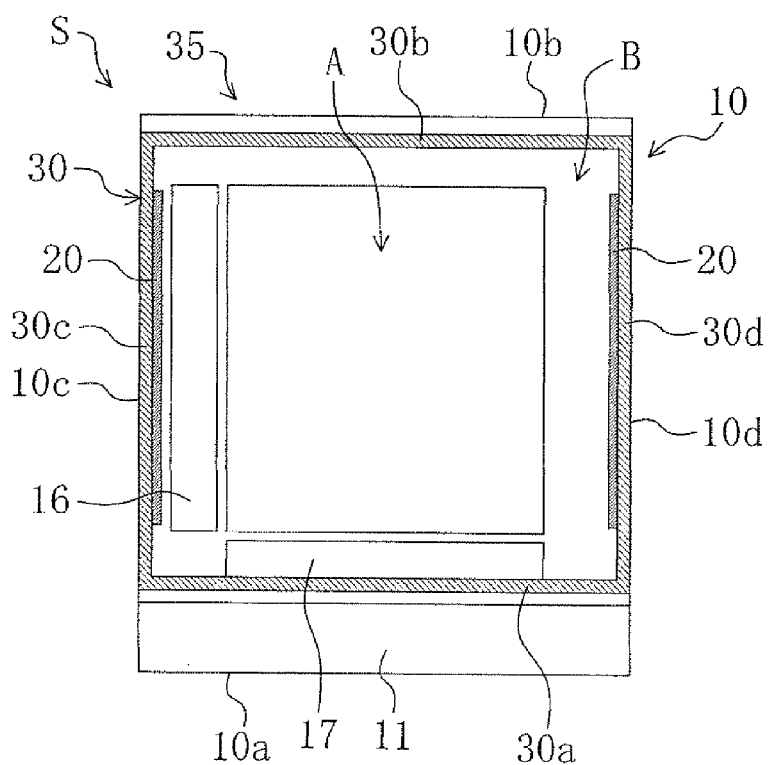

LIQUID CRYSTAL DISPLAY HAVING A TERMINAL PORTION AND A SEALING MEMBER WHEREIN NEITHER A FIRST OR A SECOND SUBSTRATE EXTENDS BEYOND AN OUTER PERIPHERY OF THE SEALING MEMBER ALONG A SIDE OF THE DISPLAY

This application is the U.S. national phase of International Application No. PCT/JP2008/000883 filed 4 Apr. 2008 which designated the U.S. and claims priority to Japanese Patent Application No. 2007-220049 filed 27 Aug. 2007, the entire contents of each of which are hereby incorporated by reference.

TECHNICAL FIELD

The present disclosure relates to liquid crystal displays (LCDs).

BACKGROUND ART

Conventionally, LCDs, which have been widely used for displays of cellular phones, game machines, audio players, and the like are known in the art. LCDs are formed by bonding a rectangular TFT substrate and a rectangular counter substrate positioned so as to face the TFT substrate, with a liquid crystal layer, sealed by a rectangular frame-shaped sealing member, being interposed therebetween.

Electrode layers are respectively formed on the TFT substrate and the counter substrate so as to face each other, and these electrode layers are electrically connected to a terminal portion, which is formed along one side of the TFT substrate. As a method of connecting the electrode layer of the counter substrate (hereinafter referred to as the "counter electrode layer") to the terminal portion, it is known to connect the counter electrode layer to the terminal portion through conductive particles dispersed in the sealing member, and a common transfer terminal portion (see Patent Document 1).

The structure of a conventional LCD 100 will be briefly described below with reference to FIG. 20. FIG. 20 is a schematic plan view of the conventional LCD 100. Note that a counter substrate is not shown in FIG. 20.

As shown in FIG. 20, the LCD 100 has a display portion 101 formed by a plurality of pixels. In the display portion 101, electrode layers are formed on a TFT substrate 102 and a counter substrate facing the TFT substrate 102, so as to face each other with a liquid crystal layer interposed therebetween. The reference numeral "103" in FIG. 20 indicates the electrode layer on the TFT substrate 102. These electrode layers on both substrates are electrically connected to a terminal portion 104, which is formed along one side of the TFT substrate 102, and is exposed to the outside from the counter substrate.

The electrode layer 103 on the TFT substrate 102 is connected to a source driver portion 105 and a gate driver portion 106, which are positioned outside the display portion 101, and is electrically connected to the terminal portion 104 through extended interconnect layers (not shown) which are extended from the driver portions 105, 106. The term "outside" as used herein indicates the direction from the middle of the LCD 100 toward the outer edge thereof. Although not shown in the figure, the driver portions 105, 106 are connected to each other by a plurality (e.g., several tens) of interconnect layers, such as clock signal interconnect layers. Interconnect layers, such as the extended interconnect layers and the clock signal interconnect layers, are formed at the four corners inside a sealing member 107 in the TFT substrate 102.

On the other hand, the electrode layer on the counter substrate (the counter electrode layer) is connected to common transfer terminal portions 108 through conductive particles contained in the rectangular sealing member 107, and the common transfer terminal portions 108 are connected to the terminal portion 104 through interconnect layers (not shown). That is, the counter electrode layer is connected to the terminal portion 104 through the conductive particles in the sealing member 107, the common transfer terminal portions 108, and the interconnect layers. The sealing member 107, the common transfer terminal portions 108, and the interconnect layers are formed outside the display portion 101.

The sealing member 107 is positioned inside, and spaced apart from, the outer edge of the TFT substrate 102. The common transfer terminal portions 108 are formed so that at least a part of each common transfer terminal portion 108 is in contact with the sealing member 107, in order to connect to the counter electrode layer through the conductive particles. The common transfer terminal portions 108 are typically positioned at the four corners of the sealing member 107 in order to reduce a non-uniform distribution of the potential difference in the counter electrode layer. Thus, the LCD 100 applies a voltage to the liquid crystal layer from the electrode layers of both substrates, which are connected to the terminal portion 104, thereby controlling orientation of liquid crystal molecules to provide desired display in the display portion 101.

Moreover, regarding manufacturing of the above LCD, it is generally known to cut a bonded substrate base material, which includes a plurality of bonded substrate regions arranged in a matrix pattern, into a plurality of bonded substrates in order to improve productivity.

The bonded substrate base material is formed by bonding a TFT substrate base material, which includes a plurality of regions forming a TFT substrate (hereinafter referred to as the "TFT substrate regions"), and a counter substrate base material, which includes a plurality of regions forming a counter substrate (hereinafter referred to as the "counter substrate regions"), together so that each TFT substrate region and each counter substrate region face each other with a corresponding rectangular frame-shaped sealing member interposed therebetween.

The sealing member is supplied at a high speed and with a relatively small width to each TFT substrate region or each counter substrate region in the TFT substrate base material or the counter substrate base material by a dispenser or the like, so that the sealing member overlaps a common transfer terminal portion when viewed from a direction normal to the surface of the bonded substrate. Thus, the bonded substrate base material has a plurality of bonded substrate regions formed by bonding the TFT substrate regions and the counter substrate regions together with the respective sealing members interposed therebetween. The bonded substrate base material is then cut along the gaps formed between the sealing members of the bonded substrate regions, thereby forming a plurality of bonded substrates.

CITATION LIST

Patent Document

PATENT DOCUMENT 1: Japanese Published Patent Application. No. H05-249483

SUMMARY OF THE INVENTION

Technical Problem

Incidentally, in the case where the plurality of bonded substrates are formed by cutting the bonded substrate base material along the gaps formed between the sealing members of the bonded substrates as described above, as shown in FIG. 20, the size of a frame portion 109 as a non-display portion increases due to the sealing member 107 positioned inside, and spaced apart from, the outer edge of the TFT substrate 102. Moreover, since the common transfer terminal portions 108 tend to be exposed outside the sealing member 107, the display quality tends to be reduced due to the influence of static electricity on the exposed common transfer terminal portions 108.

Moreover, in the case where the sealing member is supplied at a high speed and with a relatively small width by a dispenser or the like as described above, the sealing member tends to be supplied at a position displaced from a desired position in a width direction of the sealing member, and the width of the sealing member tends to vary. Thus, relatively large common transfer terminal portions are formed so that the common transfer terminal portions are reliably in contact with the sealing member with a sufficient contact area.

However, in the case of forming large common transfer terminal portions, as shown in FIG. 20, a region of the TFT substrate 102 for forming the interconnect layers at the four corners inside the sealing member 107 is reduced in size, whereby formation of the interconnect layers is hindered by the common transfer terminal portion 108. Especially, since the interconnect layers are formed at a high density at the corner on the terminal portion 104 side (the lower left side in the figure) inside the sealing member 102, the width of the interconnect layers needs to be reduced, thereby increasing the interconnect resistance of the interconnect layers. Such increased interconnect resistance of the interconnect layers tends to cause write failures to the pixels, thereby reducing the display quality.

The present invention was developed in view of the above problems, and it is an object of the present invention to reduce the proportion of a frame portion in an entire LCD, and to improve the display quality.

Solution to the Problem

In order to achieve the above object, according to the present invention, at least one side of a sealing member is formed on an outer edge of a first substrate, and a common transfer terminal portion is formed along at least a part of the sealing member formed on the outer edge of the first substrate.

More specifically, an LCD of the present invention includes: a rectangular first substrate; a rectangular second substrate positioned so as to face the first substrate; a liquid crystal layer sealed between the first substrate and the second substrate by a rectangular frame-shaped sealing member containing conductive particles; a terminal portion formed outside the sealing member in the first substrate, for applying a voltage to the liquid crystal layer; a first electrode layer formed on a surface located inside the sealing member in the first substrate, and electrically connected to the terminal portion; a common transfer terminal portion electrically connected to the terminal portion, and being in contact with the conductive particles; and a second electrode layer formed in the second substrate, positioned so as to face the first electrode layer, and electrically connected to the terminal portion through the conductive particles and the common transfer terminal portion, where interconnect layers are formed at least one of four corners inside the sealing member in the first substrate, wherein at least one side of the sealing member is formed on an outer edge of the first substrate, and the common transfer terminal portion is formed along at least a part of the sealing member formed on the outer edge of the first substrate.

It is preferable that two sides of the sealing member, which extend perpendicularly to one side on the terminal portion side, be formed on the outer edge of the first substrate.

It is preferable that one side of the sealing member, which faces a side on the terminal portion side, and two sides of the sealing member, which extend perpendicularly to the side on the terminal portion side, be formed on the outer edge of the first substrate.

It is preferable that the common transfer terminal portion be formed along an entire length of the sealing member formed on the outer edge of the first substrate.

It is preferable that the common transfer terminal portion be formed along at least a part of the sealing member other than corners of the sealing member, which are located on the terminal portion side.

[Functions]

Functions of the present invention will be described below.

In an LCD of the present invention, since at least one side of a sealing member is formed on an outer edge of a first substrate, no frame portion is formed outside at least one side of the sealing member, whereby the area of the frame portion is reduced. Moreover, since a common transfer terminal portion is prevented from being exposed outside at least one side of the sealing member, the influence of external static electricity on the common transfer terminal portion is reduced.

In addition, at least one side of the sealing member is positioned on the outer edge of the first substrate. Thus, even if the width of the sealing member varies depending on the position, the common transfer terminal portion is reliably in contact with the sealing member, and thus, with conductive particles. This eliminates the need to form a relatively large common transfer terminal portion, whereby the size of the common transfer terminal portion can be reduced.

Moreover, since the common transfer terminal portion is formed along at least a part of the sealing member formed on the outer edge of the first substrate, the area of the common transfer terminal portion positioned at the four corners inside the sealing member is reduced, and a region of the first substrate for forming interconnect layers is secured. This eliminates the need to reduce the width of the interconnect layers, whereby the interconnect resistance of the interconnect layers is reduced, and write failures to pixels of a display portion are reduced. As a result, the proportion of the frame portion in the entire LCD is reduced, and the display quality is improved.

Moreover, in the case where two sides of the sealing member, which are perpendicular to one side on the terminal portion side, are formed on the outer edge of the first substrate, no frame portion is formed outside the two sides of the sealing member. Thus, the area of the frame portion is further reduced as compared to the case where only one side of the sealing member is formed on the outer edge of the first substrate, whereby the proportion of the frame portion in the entire LCD is further reduced.

Moreover, in the case where one side of the sealing member, which faces the side on the terminal portion side, and the two sides perpendicular to the side on the terminal portion side are formed on the outer edge of the first substrate, no frame portion is formed outside these three sides of the sealing member. Thus, the area of the frame portion is further reduced as compared to the case where only one or two sides of the sealing member are formed on the outer edge of the first substrate, whereby the proportion of the frame portion in the LCD is further reduced.

In the case where the common transfer terminal portion is formed along the entire length of the sealing member formed on the outer edge of the first substrate, the potential difference, which is generated in the second electrode layer, is reduced as compared to the case where the common transfer terminal portion is formed along only a part of the sealing member formed on the outer edge of the first substrate.

In the case where the common transfer terminal portion is formed along at least a part of the sealing member other than the corners of the sealing member, which are located on the terminal portion side, no common transfer terminal portion is formed at the corners inside the sealing member located on the terminal portion side, where the interconnect layers are formed at a high density. Thus, a sufficient region of the first substrate for fanning the interconnect layers is secured at these corners inside the sealing member. This enables the interconnect layers having a sufficient width to be formed, whereby the interconnect resistance of the interconnect layers is further reduced, and the display quality is further improved.

ADVANTAGES OF THE INVENTION

According to the present invention, since no frame portion is formed outside at least one side of a sealing member, the area of the frame portion can be reduced. Moreover, since a common transfer terminal portion can be prevented from being exposed outside at least one side of the sealing member, the influence of external static electricity on the common transfer terminal portion can be reduced. In addition, since the common transfer terminal portion can be reliably in contact with the sealing member, and thus, with conductive particles, the size of the common transfer terminal portion can be reduced. Moreover, since the common transfer terminal portion is formed along at least a part of the sealing member formed on an outer edge of a first substrate, a region of the first substrate for forming interconnect layers can be secured. This eliminates the need to reduce the width of the interconnect layers, whereby the interconnect resistance of the interconnect layers can be reduced, and write failures to pixels of a display portion can be reduced. As a result, the proportion of the frame portion in an entire LCD can be reduced, and the display quality can be improved.

BRIEF DESCRIPTION OF THE DRAWINGS

FIG. 10 is a schematic plan view of an LCD of a fifth embodiment.

FIG. 11 is a schematic plan view of an LCD of a sixth embodiment.

Figure 1:
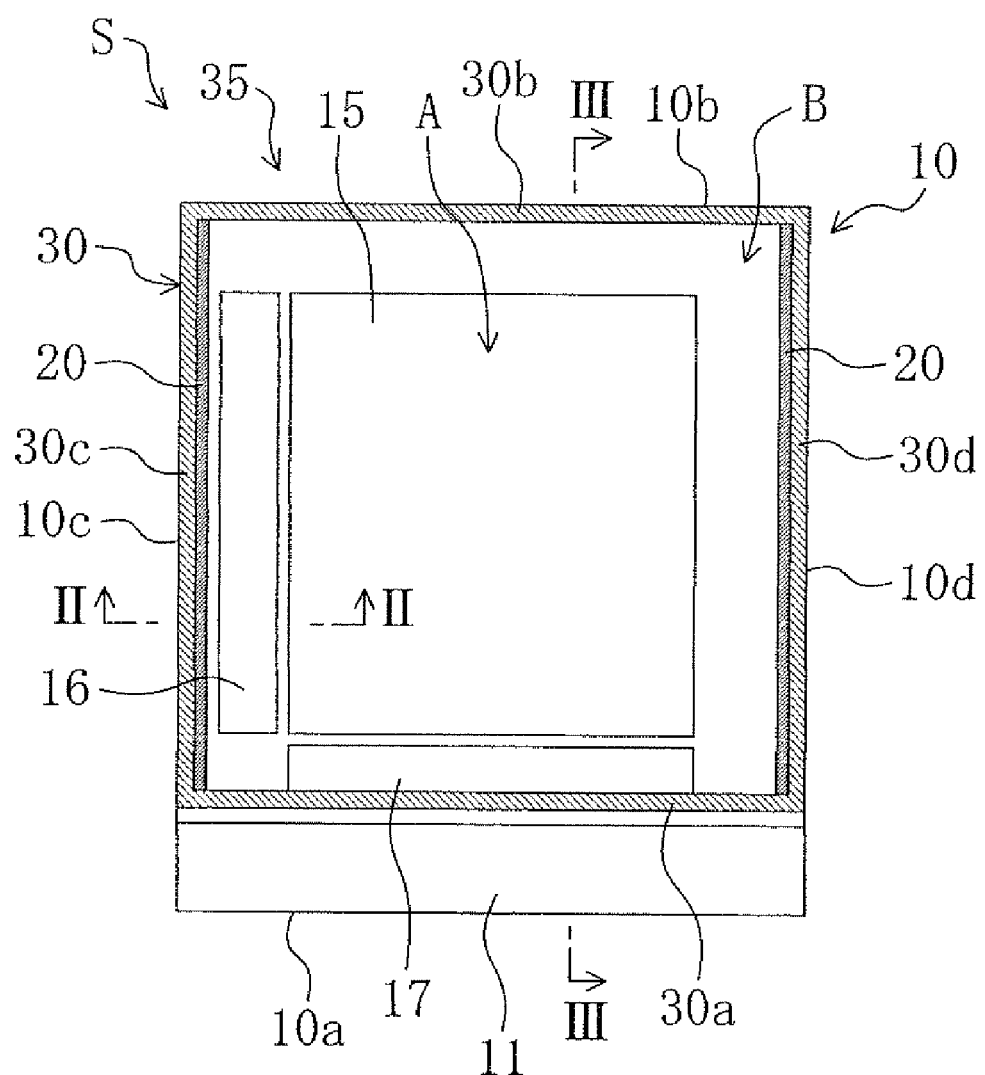
FIG. 1 is a schematic plan view of an LCD of a first embodiment.

DESCRIPTION OF REFERENCE CHARACTERS (S) LCD
(10) TFT Substrate (First Substrate)
(11) Terminal Portion
(15) Pixel Electrode Layer (First Electrode Layer)
(20) Common Transfer Terminal Portion
(30) Sealing Member
(31) Liquid Crystal Layer
(40) Counter Substrate (Second Substrate)
(44) Counter Electrode Layer (Second Electrode Layer)

DESCRIPTION OF EMBODIMENTS

Embodiments of the present invention will be described in detail below with reference to the accompanying drawings. Note that the present invention is not limited to the following embodiments.

First Embodiment

Figure 2:
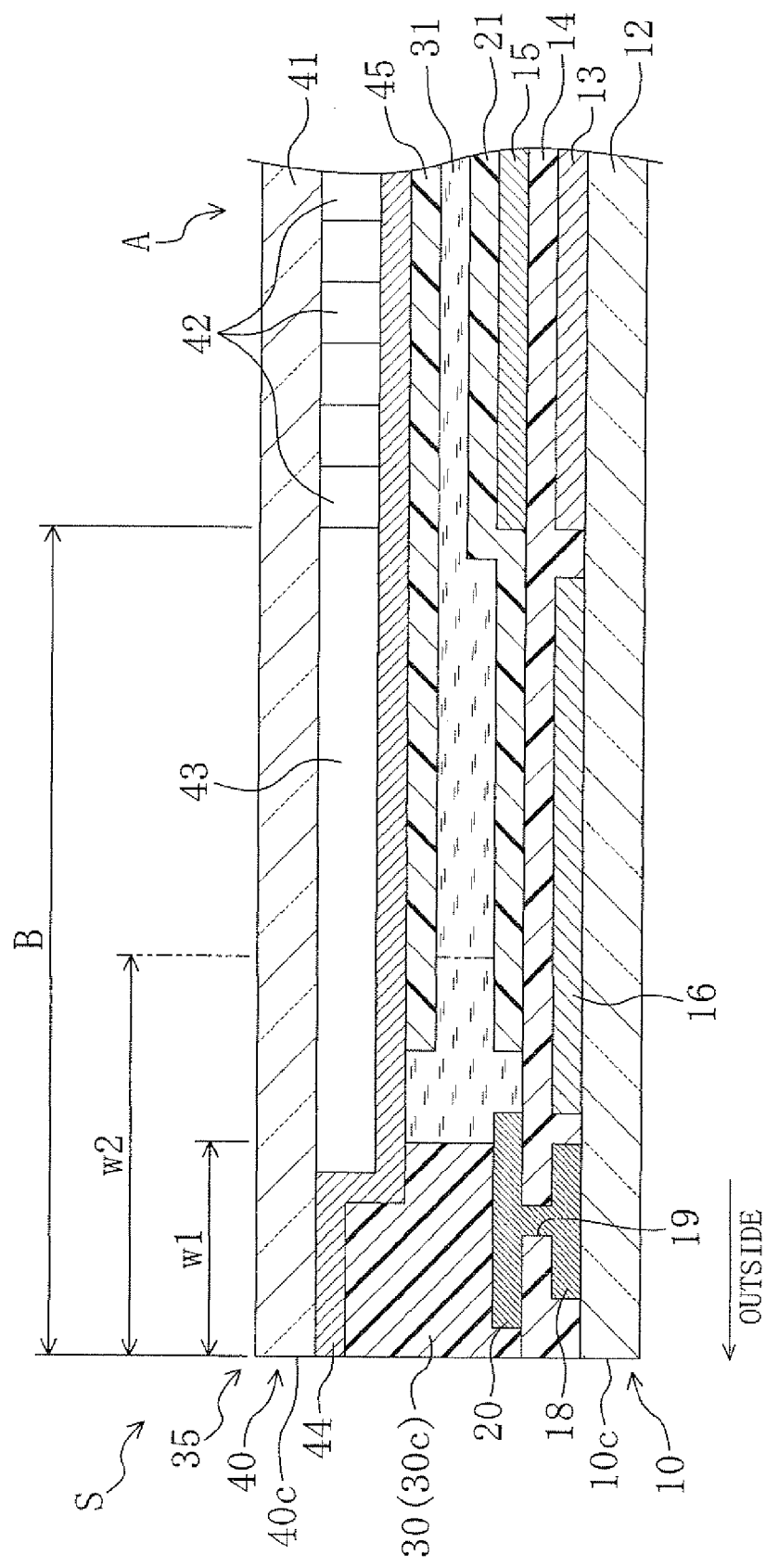
FIG. 2 is a schematic cross-sectional view taken along line II-II in FIG.
Figure 3:
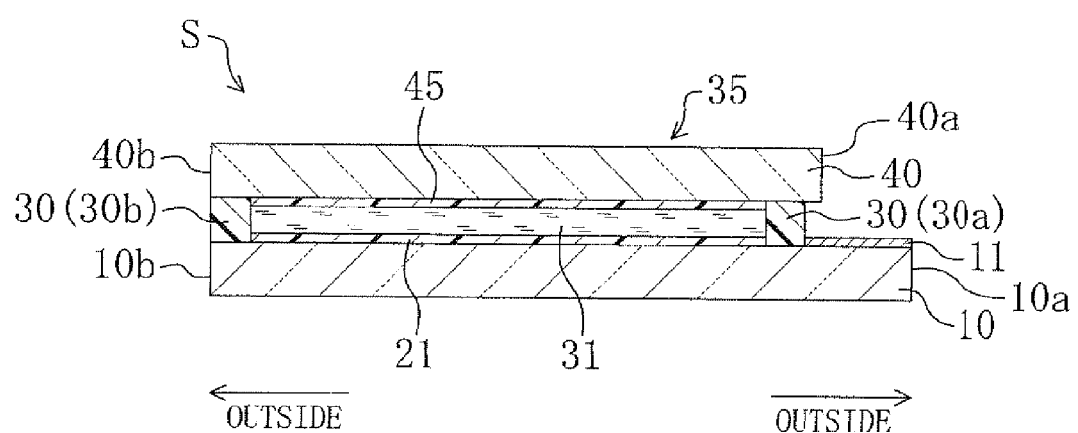
FIG. 3 is a schematic cross-sectional view taken along line in FIG. 1.
Figure 4:
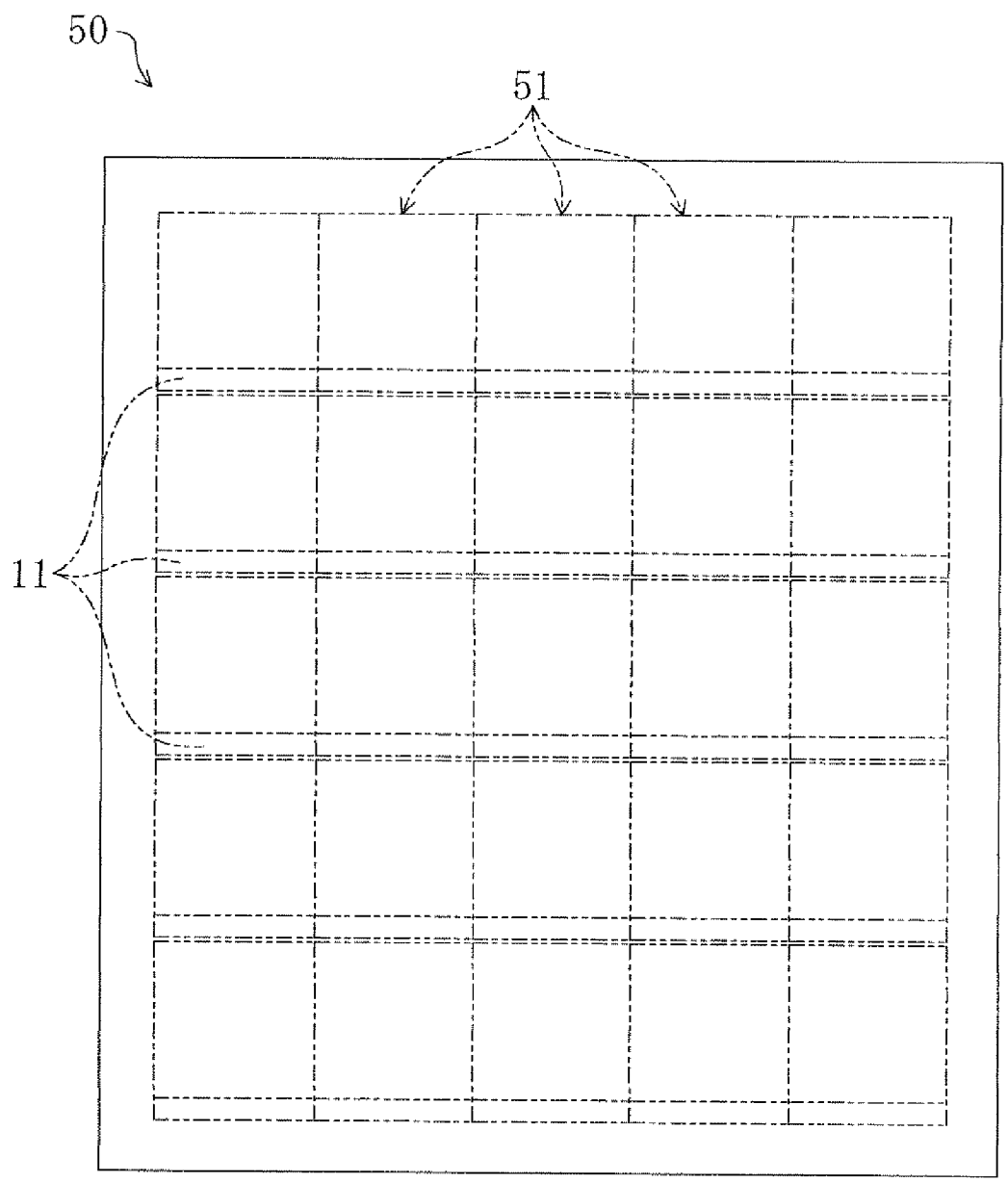
FIG. 4 is a schematic plan view of a TFT substrate base material.
Figure 5:
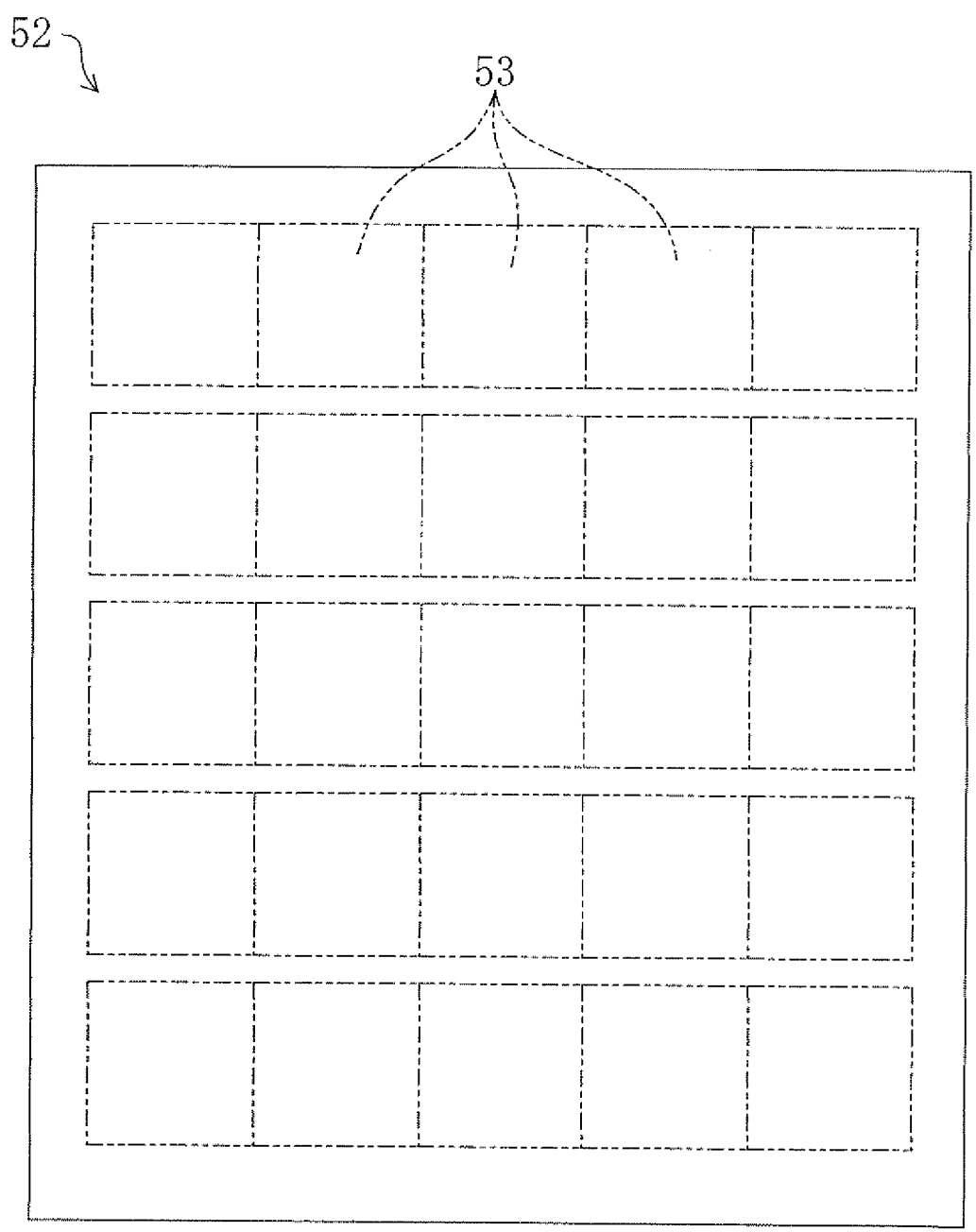
FIG. 5 is a schematic plan view of a counter substrate base material.
Figure 6:
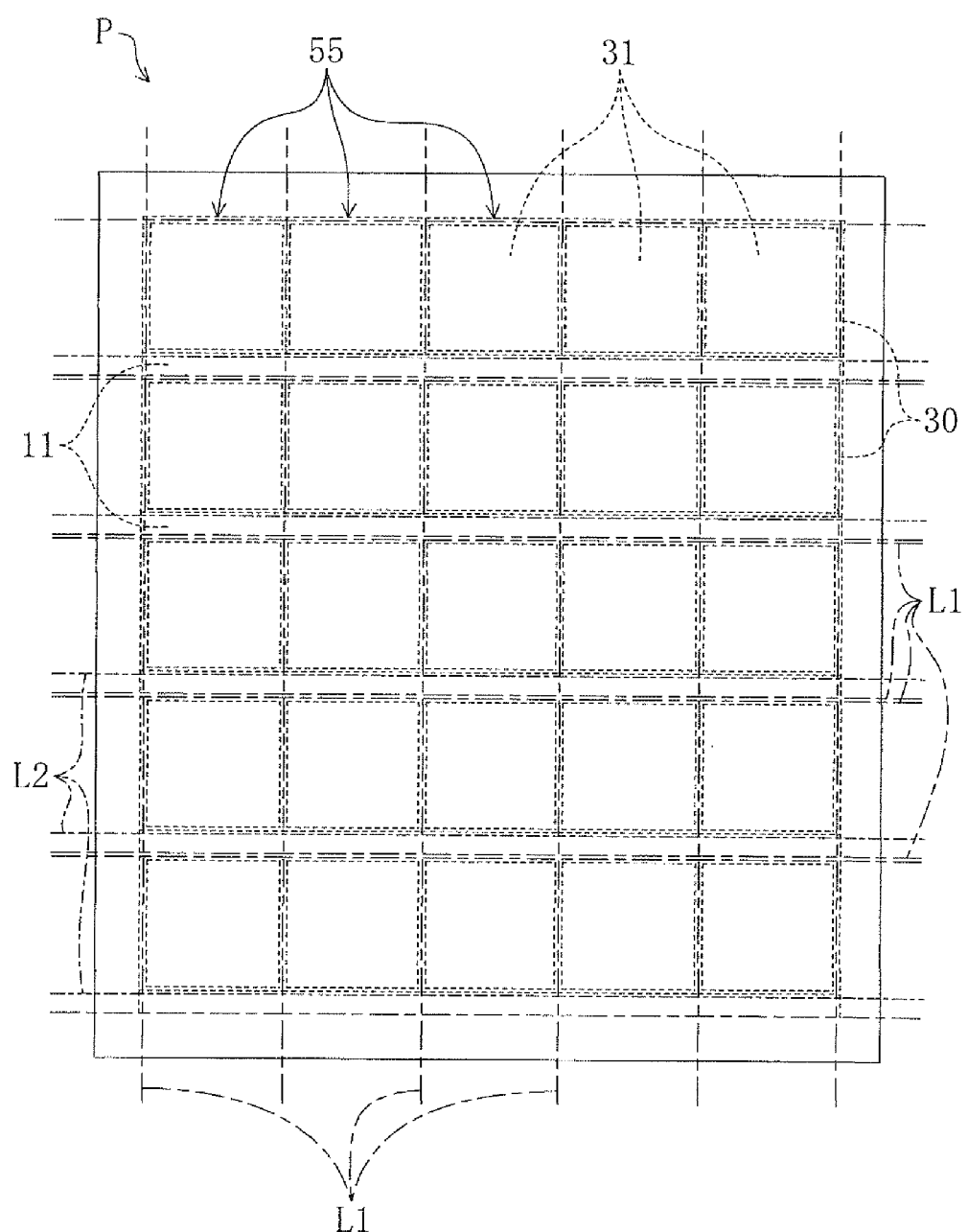
FIG. 6 is a schematic plan view of a bonded substrate base material.

FIGS. 1 through 6 show a first embodiment of the present invention. FIG. 1 is a schematic plan view of an LCD S of the first embodiment. FIG. 2 is a cross-sectional view of a main part of the LCD S, showing a common transfer terminal portion 20 of the LCD S. FIG. 3 is a schematic cross-sectional view of the LCD S. FIGS. 4 through 6 are diagrams illustrating a manufacturing method of the LCD S. Note that a counter substrate 40 is not shown in FIG. 1.

As shown in FIG. 1, the LCD S has a display portion A formed by a plurality of pixels (not shown), for providing desired display, and a frame portion B, which is a non-display portion located outside the display portion A in the LCD S. The term "outside" as used herein indicates the direction from the middle of the LCD S toward the outer edge thereof.

As shown in FIG. 3, the LCD S includes a bonded substrate 35, where the bonded substrate 35 has a TFT substrate 10 as a first substrate, a counter substrate 40 as a second substrate positioned so as to face the TFT substrate 10, a liquid crystal layer 31 sealed between the TFT substrate 10 and the counter substrate 40 by a rectangular frame-shaped sealing member 30, and a terminal portion 11 formed outside the sealing member 30 in the TFT substrate 10, for applying a voltage to the liquid crystal layer 31.

The TFT substrate 10 and the counter substrate 40 have a rectangular shape, and alignment films 21, 45 are respectively formed on the surfaces on the liquid crystal layer 31 side of the TFT substrate 10 and the counter substrate 40. The longitudinal width (the vertical size in FIG. 1, and the lateral size in FIG. 3) of the TFT substrate 10 is larger than that of the counter substrate 40, and a longitudinal (the vertical direction in FIG. 1, and the lateral direction in FIG. 3) upper side 10b of the TFT substrate 10 overlaps a longitudinal upper side 40b of the counter substrate 40, when viewed from a direction perpendicular to the surface of the TFT substrate 10. Moreover, the terminal portion 11 is formed along a longitudinal lower side 10a of the TFT substrate 10, and is exposed to the outside from the counter substrate 40.

As shown in FIG. 1, at least one side of the sealing member 30 is formed on the outer edge of the TFT substrate 10. In the first embodiment, three sides 30b, 30c, 30d of the sealing member 30, which are one side (the upper side in FIG. 1) 30b facing one side (the lower side in FIG. 1) 30a on the terminal portion 11 side, and two sides (the left and right sides in FIG. 1) 30c, 30d extending perpendicularly to the side 30a on the terminal portion 11 side, are formed on the outer edge of the TFT substrate 10.

The sealing member 30 is made of, e.g., an epoxy resin, an acrylic resin, or the like, and contains conductive particles (not shown). The conductive particles are formed by covering the surfaces of spherical particles, made of, e.g., an elastic resin, with a conductive material such as nickel, carbon, silver, or gold, or by other methods.

As shown in FIGS. 1 and 2, the LCD S further includes: a pixel electrode layer 15 as a first electrode layer, which is formed on the surface located inside the sealing member 30 in the TFT substrate 10, and is electrically connected to the terminal portion 11; common transfer terminal portions 20, which are electrically connected to the terminal portion 11, and are in contact with the conductive particles; and a counter electrode layer 44 as a second electrode layer, which is formed in the counter substrate 40 and positioned so as to face the pixel electrode layer 15, and is electrically connected to the terminal portion 11 through the conductive particles and the common transfer terminal portions 20.

That is, the bonded substrate 35 has the pixel electrode layer 15, the common transfer terminal portions 20, and the counter electrode layer 44. As shown in FIG. 2, the TFT substrate 10 has a glass substrate 12 having, e.g., a rectangular shape, such as a no-alkali glass substrate, and a switching layer 13 for switching voltage application to the liquid crystal layer 31 in each pixel is formed substantially in the middle of the glass substrate 12.

Although not shown in the figures, a plurality of source interconnect layers extending in one direction horizontal to the surface of the glass substrate 12, and a plurality of gate interconnect layers extending in a direction horizontal to the surface of the glass substrate 12 and perpendicular to the source interconnect layers, are formed in the switching layer 13. Moreover, a TFT (Thin Film Transistor), connected to a corresponding source interconnect layer and a corresponding gate interconnect layer, is formed at each intersection of the source interconnect layers and the gate interconnect layers. The plurality of TFTs are arranged in a matrix pattern.

A part of the switching layer 13 is covered by a planarizing layer 14, such as a SiO layer, and the pixel electrode layer 15 is formed on the surface of the planarizing layer 14. Although shown as one layer in FIG. 3, the pixel electrode layer 15 is actually positioned at each intersection of the source interconnect layers and the gate interconnect layers in a matrix pattern corresponding to the TFTs, and the pixel electrode layers 15 are respectively connected to the TFTs of the switching layer 13 through contact holes (not shown) formed in the planarizing layer 14.

Moreover, as shown in FIGS. 1 and 2, a source driver portion 16, a gate driver portion 17, and the like are formed outside the switching layer 13 in the TFT substrate 10, and a common interconnect layer 18, which is an interconnect layer extending from the terminal portion 11, and the common transfer terminal portions 20 connected to the common interconnect layer 18, are formed outside the driver portions 16, 17.

The driver portions 16, 17 are covered by the planarizing layer 14, the plurality of source interconnect layers are connected to the source driver portion 16, and the plurality of gate interconnect layers are connected to the gate driver portion 17. The source driver portion 16 is positioned along one side (the left side in FIG. 1) 10c of the TFT substrate 10, which is perpendicular to one side 10a on the terminal portion 11 side. The gate driver portion 17 is positioned on the terminal portion 11 side.

Although not shown in the figures, the driver portions 16, 17 are connected to extended interconnect layers extended from the terminal portion 11, and are connected to the terminal portion 11 through the extended interconnect layers, and the driver portions 16, 17 are also connected to each other through a plurality (e.g., several tens) of interconnect layers, such as clock signal interconnect layers. Thus, interconnect layers, such as the extended interconnect layers and the clock signal interconnect layers, are formed at a high density at the corners on the terminal portion 11 side inside the sealing member 30 in the TFT substrate 10.

In order to reduce the influence of static electricity on the LCD S, the common interconnect layer 18 is formed inside, and spaced apart from, the outer edge of the TFT substrate 10, and is formed along the three sides 10b, 10c, 10d of the TFT substrate 10, other than the side 10a on the terminal portion 11 side, so as to have a substantially annular shape. The common interconnect layer 18 is partially covered by the planarizing layer 14, and the common transfer terminal portions 20 are formed on the surface of the planarizing layer 14.

Each common transfer terminal portion 20 is connected to the common interconnect layer 18 through a corresponding contact hole 19 formed in the planarizing layer 14. Moreover, like the common interconnect layer 18, each common transfer terminal portion 20 is formed inside, and spaced apart from, the outer edge of the TFT substrate 10. Thus, the common transfer terminal portions 20 are connected to the terminal portion 11 through the common interconnect layer 18.

As shown in FIG. 1, the common transfer terminal portions 20 are formed along at least a part of the sealing member 30 formed on the outer edge of the TFT substrate 10. In the first embodiment, a pair of common transfer terminal portions 20 are formed along the entire length of only the two sides 30c, 30d of the sealing member 30, which are perpendicular to the side 30b on the terminal portion 11 side, and at least a part of each common transfer terminal portion 20 in the width direction overlaps the sealing member 30, and is in contact with the sealing member 30 with a predetermined contact area, when viewed from a direction perpendicular to the surface of the TFT substrate 10. The contact area between each common transfer terminal portion 20 and the sealing member 30 can be determined as appropriate according to the material of the conductive particles contained in the sealing member 30.

A width (hereinafter referred to as the "sealing width") w1 of the sealing member 30 in FIG. 2 shows a sealing width in the ease where the sealing member 30 has a minimum width. Moreover, a sealing width w2 in FIG. 2 shows a sealing width in the case where the sealing member 30 has a maximum width. Thus, the pair of common transfer terminal portions 20 are in contact with the conductive particles in the sealing member 30.

On the other hand, as shown in FIG. 2, the counter substrate 40 has a glass substrate 41 having, e.g., a rectangular shape, such as a no-alkali glass substrate. A plurality of color filter layers 42, which are positioned so as to face the pixel electrode layers 15, and form the pixels, are formed in the counter substrate 40. The color filter layers 42 are formed so as to face the pixel electrode layers 15 of the TFT substrate 10, respectively. That is, the plurality of color filter layers 42 are arranged in a matrix pattern. Moreover, a black matrix layer 43 is formed outside the color filter layers 42, and between the plurality of color filter layers 42 in the counter substrate 40. Note that the black matrix layer 43 between the color filter layers 42 is not shown in FIG. 2.

The counter electrode layer 44 covers the plurality of color filter layers 42 and the black matrix layer 43. A part of the counter electrode layer 44 is in direct contact with the sealing member 30, and thus, is in contact with the conductive particles in the sealing member 30. That is, the counter electrode layer 44 is connected to the terminal portion 11 through the conductive particles in the sealing member 30, the common transfer terminal portions 20, and the common interconnect layer 18.

The LCD S further has polarizers (not shown) on the surfaces of the bonded substrate 35. That is, the polarizers are laminated on the respective surfaces of the TFT substrate 10 and the counter substrate 40, which are located on the side opposite to the liquid crystal layer 31. Moreover, although not shown in the figures, a backlight unit for emitting light to the bonded substrate 35 from one surface side thereof, and a liquid crystal driving IC (Integrated Circuit), and the like are attached to the bonded substrate 35. Thus, the LCD S applies a voltage to the liquid crystal layer 31 by the pixel electrode layers 15 and the counter electrode layer 44 through the terminal portion 11, thereby providing desired display on the display portion A.

[Manufacturing Method]

A manufacturing method of the LCD S has a bonded substrate base material forming step, and a cutting step.

In the bonded substrate base material forming step, a bonded substrate base material P, having bonded substrates 35 arranged in a matrix pattern and formed integrally, is formed as shown in FIG. 6. The bonded substrate base material forming step includes a TFT substrate base material forming step, a counter substrate base material forming step, and a bonding step.

In the TFT substrate base material forming step, a TFT substrate base material 50, having TFT substrates 10 arranged in a matrix pattern and formed integrally, is formed as shown in FIG. 4. That is, on one surface of a large glass substrate that has a plurality of regions 51 having, e.g., a rectangular shape, for forming the TFT substrate 10 (hereinafter referred to as the "TFT substrate regions"), the switching layer 13, the common interconnect layer 18, the planarizing layer 14, the pixel electrode layers 15, the common transfer terminal portions 20, and the terminal portion 11 are formed in each TFT substrate region 51, and then, the alignment film 21 is provided in each TFT substrate region 51, thereby forming the TFT substrate base material 50 having the structure of the TFT substrate 10 in each TFT substrate region 51. At this time, the common transfer terminal portions 20 are formed along cutting lines L1 at positions determined in view of cutting tolerance (displacement of the cutting lines L1), so that the common transfer terminal portions 20 are not divided in the cutting step that is performed later. The TFT substrate regions 51 in the TFT substrate base material 50 are located adjacent to each other with no gap provided between adjoining ones of the TFT substrate regions 51 having no terminal portion 11 therebetween.

In the counter substrate base material forming step, a counter substrate base material 52, having counter substrates 40 arranged in a matrix pattern and formed integrally, is formed as shown in FIG. 5. That is, on one surface of a large glass substrate that has a plurality of regions 53 having, e.g., a rectangular shape, for forming the counter substrate 40 (hereinafter referred to as the "counter substrate regions"), the color filter layers 42, the black matrix layer 43, and the counter electrode layer 44 are formed in each counter substrate region 53, and then, the alignment film 45 is provided in each counter substrate region 53, thereby forming the counter substrate base material 52 having the structure of the counter substrate 40 in each counter substrate region 53.

The plurality of counter substrate regions 53 in the counter substrate base material 52 are positioned so as to respectively overlap the TFT substrate regions 51 excluding the terminal portions 11, when viewed from a direction normal to the surface of the bonded substrate base material P, when the bonded substrate base material P is formed in a later step. That is, in the counter substrate base material 52, a region facing the respective terminal portion 11 is provided outside one side of each counter substrate region 53.

The plurality of counter substrate regions 53 are positioned adjacent to each other so that adjoining ones of the counter substrate regions 53, with no region of the counter substrate base material 52 facing the terminal portion 11, being interposed therebetween, are arranged in line. That is, the plurality of counter substrate regions 53 are provided as a plurality of strips in the width direction in the counter substrate base material 52, when viewed as a whole.

In the following bonding step, the TFT substrate base material 50 and the counter substrate base material 52 are bonded together with a plurality of frame-shaped sealing members 30 interposed therebetween. First, an uncured sealing member 30, which is, e.g., an epoxy resin or an acrylic resin, is supplied to each counter substrate region 53 of the counter substrate base material 52 by a dispenser or the like. The sealing member 30 having a rectangular frame shape is supplied to the outer edge portion of each counter substrate region 53. At this time, the sealing member 30 of each counter substrate region 53 is supplied integrally with the sealing members 30 of other counter substrate regions 53 adjoining that counter substrate region 53 with no gap therebetween, so that one side of each sealing member 30 is shared by adjoining ones of the counter substrate regions 53.

Then, a predetermined amount of a liquid crystal material is dropped onto a region inside each sealing member 30 of the counter substrate base material 52. For example, the liquid crystal material is dropped by a dropper having a function to drop a liquid crystal material, where the dropper drops the liquid crystal material while moving all over the counter substrate base material 52. This dropper includes, e.g., a cylinder filled with the liquid crystal material, a piston for forcing the liquid crystal material out of the cylinder, and a dropping nozzle provided at the tip of the cylinder, and drops the liquid crystal material from the dropping nozzle by forcing the liquid crystal material out of the cylinder by the piston.

Then, the TFT substrate base material 50 and the counter substrate base material 52 are bonded together so that the TFT substrate regions 51 and the counter substrate regions 53 respectively face each other with the sealing members 30 interposed therebetween, thereby forming the bonded substrate base material P.

First, the TFT substrate base material 50 and the counter substrate base material 52 are positioned so that the respective surfaces having the alignment films 21, 45 face each other. Then, the substrate base materials 50, 52 are aligned by alignment marks (not shown) for performing alignment, which are provided in advance at diagonally opposite corners of the TFT substrate base material 50 and the counter substrate base material 52. That is, after the substrate base materials 50, 52 are roughly aligned without contacting each other, the substrate base materials 50, 52 are finely aligned in the state where the opposing surfaces of the substrate base materials 50, 52 are substantially in contact with each other, whereby the TFT substrate base material 50 and the counter substrate base material 52 are bonded together with the plurality of sealing members 30 interposed therebetween. Such bonding of the TFT substrate base material 50 and the counter substrate base material 52 is performed in a vacuum environment, such as, e.g., in a vacuum chamber.

Then, the sealing members 30 are cured. First, ultraviolet light is emitted to the bonded substrate base material P to preliminarily cure the sealing members 30. Then, a heat treatment is performed on the bonded substrate base material P to permanently cure the sealing members 30. At this time, the regions surrounded by the sealing members 30 between the TFT substrate regions 51 and the counter substrate regions 53 become liquid crystal layers 31.

Thus, as shown in FIG. 6, the bonded substrate base material P having a plurality of bonded substrate regions 55 is formed, where each bonded substrate region 55 is formed by the TFT substrate region 51 and the counter substrate region 53 bonded together with the sealing member 30 interposed therebetween. In the bonded substrate base material P, the sealing members 30 are formed integrally with each other in adjoining ones of the bonded substrate regions 55, whose liquid crystal layers 31 are located adjacent to each other with no terminal portion interposed therebetween (i.e., located adjacent to each other in the lateral direction in FIG. 6).

In the following cutting step, the bonded substrate base material P is cut together with the sealing members 30 into a plurality of bonded substrates 35. That is the TFT substrate base material 50 and the counter substrate base material 52 are cut while cutting each sealing member 30 substantially in the middle in the width direction.

In this cutting step, the bonded substrate base material P is cut along cutting lines L1, L2 by a cutter wheel having a rotary blade, a laser, or the like. At this time, along the cutting lines L1, both the TFT substrate base material 50 and the counter substrate base material 52 are cut together with the sealing members 30, while, along the cutting lines L2, only the counter substrate base material 52 is cut outside the sealing members 30 to remove the counter substrate base material 52 facing the terminal portions 11, thereby exposing the terminal portions 11. Thus, the three sides 30b, 30c, 30d of each sealing member 30 are formed on the outer edge of the TFT substrate 10.

Then, in each bonded substrate 35, the polarizers are respectively positioned on the respective surfaces of the TFT substrate 10 and the counter substrate 40, which are located on the side opposite to the liquid crystal layer 12, and the backlight unit, the liquid crystal driving IC, and the like are attached. Thus, the bonded substrate base material P, including the plurality of rectangular frame-shaped sealing members 30 between the TFT substrate base material 50 and the counter substrate base material 52, is cut on the sealing members 30, thereby forming the bonded substrates 35, each having three sides 30b, 30e, 30d of the sealing member 30 formed on the outer edge of the TFT substrate 10. The LCD S is manufactured in this manner.

Effects of the First Embodiment

Thus, according to the first embodiment, since at least one side of the sealing member 30 is formed on the outer edge of the TFT substrate 10, no frame portion B is formed outside at least one side of the sealing member 30, whereby the area of the frame portion B can be reduced. Moreover, since the common transfer terminal portions 20 can be prevented from being exposed outside at least one side of the sealing member 30, the influence of external static electricity on the common transfer terminal portions 20 can be reduced.

In addition, at least one side of the sealing member 30 is positioned on the outer edge of the TFT substrate 1. Thus, even if the width of the sealing member 30 varies depending on the position, such as in the case where the sealing member 30 has the minimum width w1 in one region, and has the maximum width w2 in another region, the common transfer terminal portions 20 can be reliably in contact with the sealing member 30, and thus, with the conductive particles. This eliminates the need to form relatively large common transfer terminal portions 20, whereby the size of the common transfer terminal portions 20 can be reduced.

Moreover, since the common transfer terminal portions 20 are formed along at least a part of the sealing member 30 formed on the outer edge of the TFT substrate 10, the area of the common transfer terminal portions 20 positioned at the four corners inside the sealing member 30 can be reduced, and the region of the TFT substrate 10 for forming the interconnect layers can be secured. This eliminates the need to reduce the width of the interconnect layers, whereby the interconnect resistance of the interconnect layers can be reduced, and write failures to the pixels of the display portion A can be reduced. As a result, the proportion of the frame portion B in the entire LCD S can be reduced, and the display quality can be improved.

Moreover, since the side 30b of the sealing member 30 facing the side 30a on the terminal portion 11 side, and the two sides 30c, 30d perpendicular to the side 30a on the terminal portion 11 side are formed on the outer edge of the TFT substrate 10, no frame portion B is formed outside the three sides 30b, 30c, 30d of the sealing member 30. Thus, the area of the frame portion B can be further reduced as compared to the case where only one or two sides of the sealing member 30 are formed on the outer edge of the TFT substrate 10. As a result, the proportion of the frame portion B in the entire LCD S can be further reduced.

Second Embodiment

Figure 7:
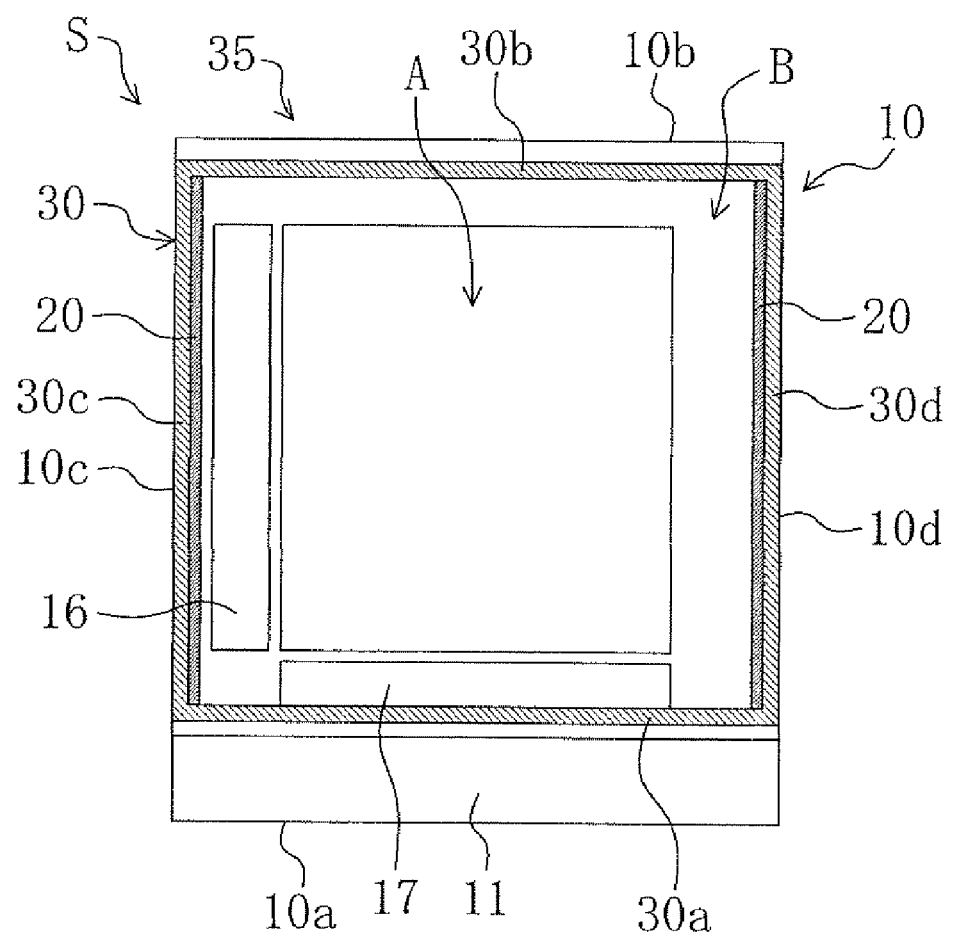
FIG. 7 is a schematic plan view of an LCD of a second embodiment.

FIG. 7 shows a second embodiment of the present invention. Note that, in the embodiments described below, the same parts as those of FIGS. 1 through 6 are denoted by the same reference characters, and detailed description thereof will be omitted. FIG. 7 is a schematic plan view of an LCD S of the second embodiment. Note that, as in FIG. 1, the counter substrate 40 is not shown in FIG. 7.

In the first embodiment, the three sides 30b, 30c, 30d of the sealing member 30, other than the side 30a on the terminal portion 11 side, are formed on the outer edge of the TFT substrate 10. However, in the second embodiment, as shown in FIG. 7, only the two sides 30c, 30d of the sealing member 30, which extend perpendicularly to the side 30a on the terminal portion 11 side, are formed on the outer edge of the TFT substrate 10.

That is, the sealing member 30 is formed so that the side 30b facing the side 30a on the terminal portion 11 side is positioned inside, and spaced apart from, the outer edge of the TFT substrate 10. Moreover, the common transfer terminal portions 20 are formed along the entire length of the sealing member (the left and right sides of the sealing members 30 in FIG. 7) 30c, 30d formed on the outer edge of the TFT substrate 10.

In the cutting step, the bonded substrate base material P is cut along the two sides (the left and right sides in FIG. 6) of the sealing member 30, which are perpendicular to the side on the terminal portion 11 side, in each bonded substrate region 55, and is cut also at a position outside the side (the upper side in FIG. 6) of the sealing member 30, which faces the side on the terminal portion 11 side. This LCD S is formed in this manner.

Effects of the Second Embodiment

Thus, according to the second embodiment as well, at least one side of the sealing member 30 is formed on the outer edge of the TFT substrate 10, and the common transfer terminal portions 20 are formed along at least a part of the sealing member 30 formed on the outer edge of the TFT substrate 10. Thus, as in the first embodiment, the proportion of the frame portion B in the entire LCD S can be reduced, and the display quality can be improved.

Moreover, since the two sides 30c, 30d of the sealing member 30, which are perpendicular to the side on the terminal portion 11 side, are formed on the outer edge of the TFT substrate 10, the area of the frame portion B is reduced as compared to the case where only one side of the sealing member 30 is formed on the outer edge of the TFT substrate 10, whereby the proportion of the frame portion B in the entire LCD S can be further reduced.

Third Embodiment

Figure 8:
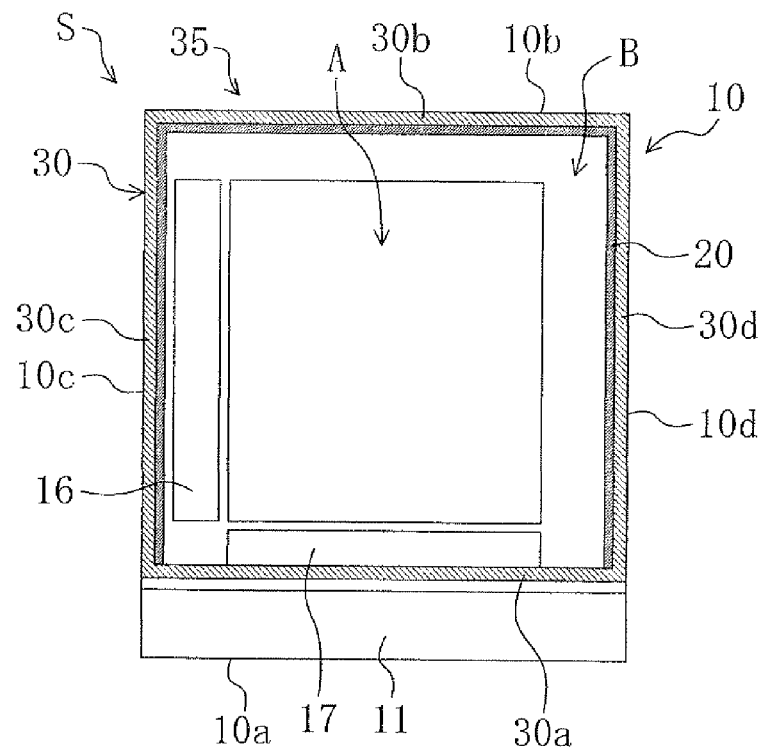
FIG. 8 is a schematic plan view of an LCD of a third embodiment.

FIG. 8 shows a third embodiment of the present invention. FIG. 8 is a schematic plan view of an LCD S. Note that, as in FIG. 1, the counter substrate 40 is not shown in FIG. 8.

In the first embodiment, the pair of common transfer terminal portions 20 are formed along the entire length of only the two sides 30c, 30d of the sealing member 30, which are perpendicular to the side 30a on the terminal portion 11 side. However, in the third embodiment, as shown in FIG. 8, the common transfer terminal portion 20 is formed along the entire length of the sealing member 30 formed on the outer edge of the TFT substrate 10.

That is, as in the first embodiment, the three sides 30b, 30c, 30d of the sealing member 30, other than the side (the lower side in FIG. 1) 30a on the terminal portion 11 side, are formed on the outer edge of the TFT substrate 10. The common transfer terminal portion 20 is formed along the entire length of the side 30b of the sealing member 30, which faces the side 30a on the terminal portion 11 side, and the two sides 30c, 30d, which are perpendicular to the side 30a on the terminal portion 11 side (that is, along the entire length of the three sides 30b, 30c, 30d of the sealing member 30, other than the side 30a on the terminal portion 11 side).

Effects of the Third Embodiment

Thus, according to the third embodiment as well, at least one side of the sealing member 30 is formed on the outer edge of the TFT substrate 10, and the common transfer terminal portion 20 is formed along at least a part of the sealing member 30 formed on the outer edge of the TFT substrate 10. Thus, effects similar to those of the first embodiment can be obtained.

Moreover, since the common transfer terminal portion 20 is formed along the entire length of the sealing member 30 formed on the outer edge of the TFT substrate 10, the potential difference, which is generated in the second electrode layer 44, can be reduced as compared to the case where the common transfer terminal portion 20 is formed along only a part of the sealing member 30 formed on the outer edge of the TFT substrate 10. As a result, the display quality can be further improved.

Fourth Embodiment

Figure 9:
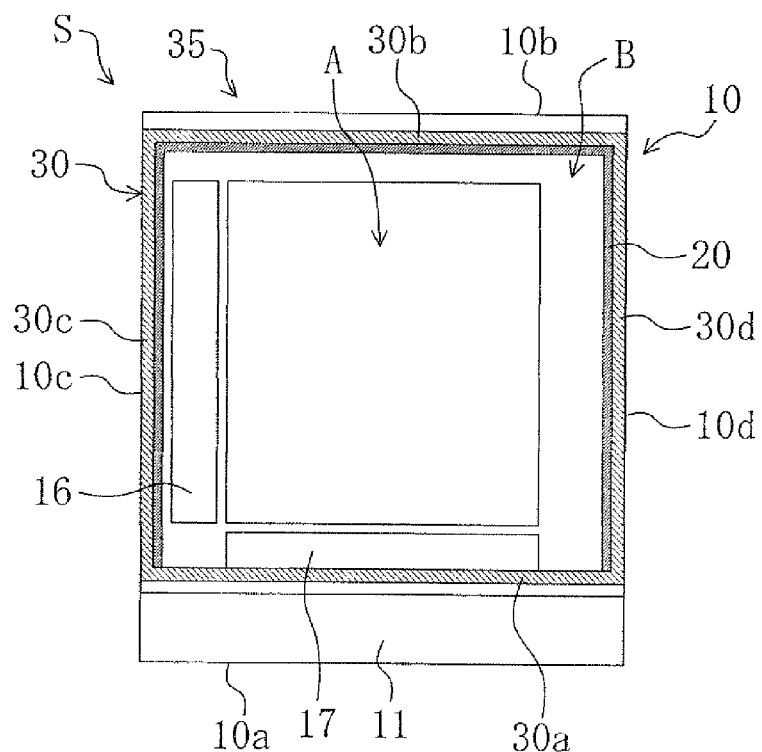
FIG. 9 is a schematic plan view of an LCD of a fourth embodiment.

FIG. 9 shows a fourth embodiment of the present invention. FIG. 9 is a schematic plan view of an LCD S. Note that, as in FIG. 1, the counter substrate 40 is not shown in FIG. 9.

In the third embodiment, as in the first embodiment, the three sides 30b, 30c, 30d of the sealing member 30, other than the side 30a on the terminal portion 11 side, are formed on the outer edge of the TFT substrate 10. However, in the fourth embodiment, as shown in FIG. 9, only the two sides 30c, 30d of the sealing member 30, which are perpendicular to the side 30a on the terminal portion 11 side, are formed on the outer edge of the TFT substrate 10. The structure is otherwise similar to that of the third embodiment.

Effects of the Fourth Embodiment

Thus, according to the fourth embodiment as well, the two sides 30c, 30d of the sealing member 30 are formed on the outer edge of the TFT substrate 10, and the common transfer terminal portion 20 is formed along the entire length of the sealing member 30 formed on the outer edge of the TFT substrate 10, and along the side 30b of the sealing member 30, which faces the side 30a on the terminal portion 11 side. Thus, effects similar to those of the first embodiment can be obtained, and also, the potential difference, which is generated in the second substrate layer, can be reduced as in the second embodiment, whereby the display quality can be further improved.

Fifth Embodiment

FIG. 10 shows a fifth embodiment of the present invention. FIG. 10 is a schematic plan view of an LCD S. Note that, as in FIG. 1, the counter substrate 40 is not shown in FIG. 10.

In the first embodiment, the common transfer terminal portions 20 are formed along the entire length of the two sides 30c, 30d of the sealing member 30, which are perpendicular to the side 30a on the terminal portion 11 side. However, in the fifth embodiment, as shown in FIG. 10, the common transfer terminal portions 20 are formed along only a part of the two sides 30c, 30d of the sealing member 30, which are perpendicular to the side 30a on the terminal portion 11 side.

That is, as in the first embodiment, the three sides 30b, 30c, 30d of the sealing member 30, other than the side (the lower side in FIG. 10) 30a on the terminal portion 11 side, are formed on the outer edge of the TFT substrate 10. One common transfer terminal portion 20 is formed only on each of the two sides 30c, 30d of the sealing member 30, which are perpendicular to the side 30a on the terminal portion 11 side, and each common transfer terminal portion 20 is formed along a part of the sealing member 30 other than the four corners thereof.

The common transfer terminal portion 20 formed along the side 30c of the sealing member 30 is formed along the entire length of the source driver portion 16 so as to have the same length as that of the source driver portion 16. The common transfer terminal portion 20 formed along the side 30d of the sealing member 30 has the same length as that of the common transfer terminal portion 20 formed along the side 30c of the sealing member 30, and these common transfer terminal portions 20 are formed so as to face each other.

Effects of the Fifth Embodiment

Thus, according to the fifth embodiment as well, at least one side of the sealing member 30 is formed on the outer edge of the TFT substrate 11, and the common transfer terminal portions 20 are formed along at least a part of the sealing member 30 formed on the outer edge of the TFT substrate 10. As a result, effects similar to those of the first embodiment can be obtained.

Moreover, since the common transfer terminal portions 20 are formed along a part of the sealing member 30 other than the four corners thereof, no common transfer terminal portion 20 is formed at the corners inside the sealing member 30 located on the terminal portion 11 side, where the interconnect layers are formed at a high density. Thus, a sufficient region of the TFT substrate 10 for forming the interconnect layers can be secured at these corners inside the sealing member 30. This enables the interconnect layers having a sufficient width to be formed, whereby the display quality can be further improved.

Sixth Embodiment

FIG. 11 shows a sixth embodiment of the present invention. FIG. 11 is a schematic plan view of an LCD S. Note that, as in FIG. 1, the counter substrate 40 is not shown in FIG. 11.

In the fifth embodiment, the three sides 30b, 30c, 30d of the sealing member 30, other than the side 30a on the terminal portion 11 side, are formed on the outer edge of the TFT substrate 10. However, in the sixth embodiment, as shown in FIG. 11, only the two sides 30c, 30d of the sealing member 30 are formed on the outer edge of the TFT substrate 10. The structure is otherwise similar to that of the fifth embodiment.

Effects of the Sixth Embodiment

Thus, according to the sixth embodiment as well, at least one side of the sealing member 30 is formed on the outer edge of the TFT substrate 10, and the common transfer terminal portions 20 are formed along a part of the sealing member 30 formed on the outer edge of the TFT substrate 10, other than the corners of the sealing member 30 located on the terminal portion 11 side. Thus, effects similar to those of the second embodiment can be obtained, and also, a sufficient region of the TFT substrate 10 for forming the interconnect layers can be secured at the corners inside the sealing member 30, as in the fifth embodiment. As a result, the display quality can be further improved.

Seventh Embodiment

Figure 12:
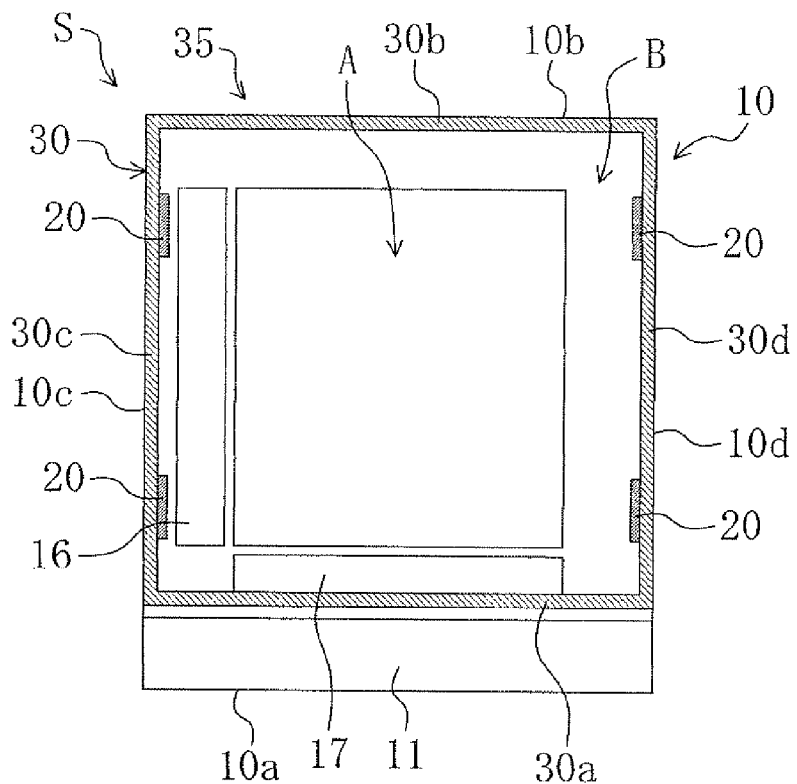
FIG. 12 is a schematic plan view of an LCD of a seventh embodiment.

FIG. 12 shows a seventh embodiment of the present invention. FIG. 12 is a schematic plan view of an LCD S. Note that, as in FIG. 1, the counter substrate 40 is not shown in FIG. 12.

In the fifth embodiment, one common transfer terminal portion 20 is formed on each of the two sides 30c, 30d of the sealing member 30. However, in the seventh embodiment, as shown in FIG. 12, a plurality of common transfer terminal portions 20 are formed on each of the two sides 30c, 30d of the sealing member 30.

That is, as in the first embodiment, the three sides 30b, 30c, 30d of the sealing member 30, other than the side (the lower side in FIG. 12) 30a on the terminal portion 11 side, are formed on the outer edge of the TFT substrate 10. The common transfer terminal portions 20 are formed only on the two sides 30c, 30d of the sealing member 30, which are perpendicular to the side 30a on the terminal portion 11 side.

Along one side 30c of the sealing member 30 are formed two common transfer terminal portions 20 respectively extending along both ends of the source driver portion 16 in the longitudinal direction (the vertical direction in FIG. 12) of the LCD S. Moreover, the other two common transfer terminal portions 20 are formed along the side 30d of the sealing member 30 so as to face the two common transfer terminal portions 20, respectively. These two common transfer terminal portions 20 are formed along a part of the sealing member 30 other than the corners of the sealing member 30 located on the terminal portion 11 side.

Effects of the Seventh Embodiment

Thus, according to the seventh embodiment as well, the three sides 30b, 30c, 30d of the sealing member 30 are formed on the outer edge of the TFT substrate 10, and the common transfer terminal portions 20 are formed along a part of the sealing member 30 formed on the outer edge of the TFT substrate 10, where the common transfer terminal portions 20 are formed along a part of the sealing member 30 other than the corners of the sealing member 30 located on the terminal portion 11 side. As a result, effects similar to those of the fifth embodiment can be obtained.

Eighth Embodiment

Figure 13:
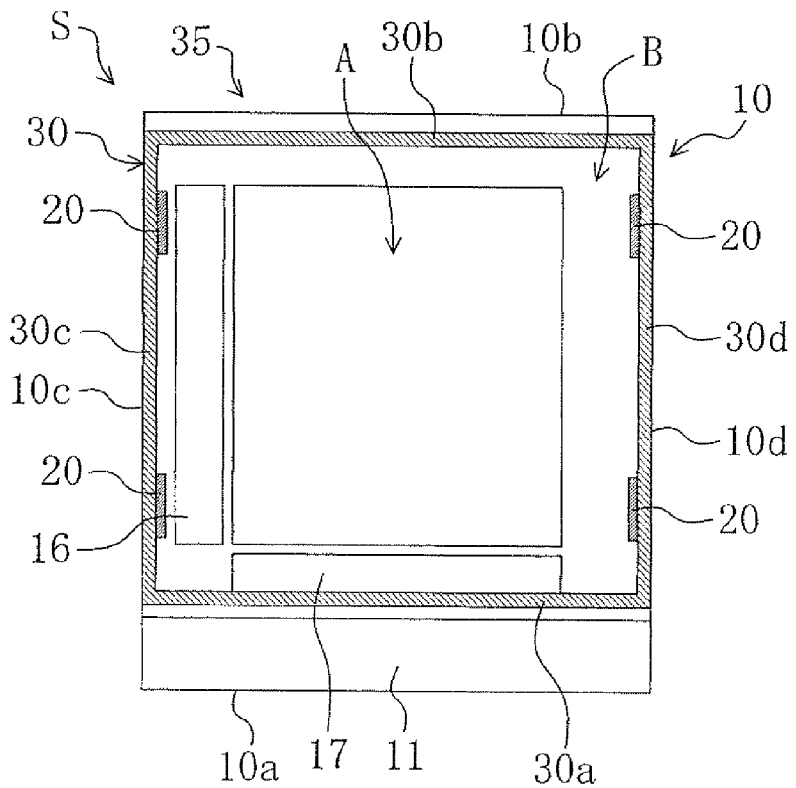
FIG. 13 is a schematic plan view of an LCD of an eighth embodiment.

FIG. 13 shows an eighth embodiment of the present invention. FIG. 13 is a schematic plan view of an LCD S. Note that, as in FIG. 1, the counter substrate 40 is not shown in FIG. 13.

In the seventh embodiment, as in the first embodiment, the three sides 30b, 30c, 30d of the sealing member 30, other than the side 30a on the terminal portion 11 side, are formed on the outer edge of the TFT substrate 10. However, in the eighth embodiment, as shown in FIG. 13, only the two sides 30c, 30d of the sealing member 30 are formed on the outer edge of the TFT substrate 10. The structure is otherwise similar to that of the seventh embodiment.

Effects of the Eighth Embodiment

Thus, according to the eighth embodiment as well, the two sides 30c, 30d of the sealing member 30 are formed on the outer edge of the TFT substrate 10, and the common transfer terminal portions 20 are formed along a part of the sealing member 30 formed on the outer edge of the TFT substrate 10, where the common transfer terminal portions 20 are formed along a part of the sealing member 30 other than the corners of the sealing member 30 located on the terminal portion 11 side. As a result, effects similar to those of the sixth embodiment can be obtained.

Ninth Embodiment

Figure 14:
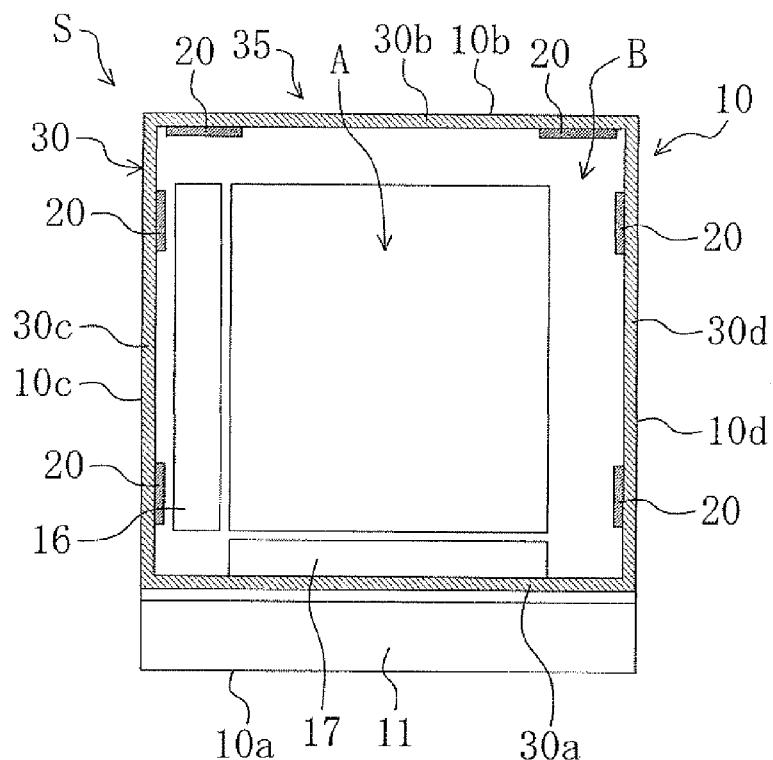
FIG. 14 is a schematic plan view of an LCD of a ninth embodiment.

FIG. 14 shows a ninth embodiment of the present invention. FIG. 14 is a schematic plan view of an LCD S. Note that, as in FIG. 1, the counter substrate 40 is not shown in FIG. 14.

In the seventh embodiment, the common transfer terminal portions 20 are formed only along the two sides 30c, 30d of the sealing member 30, which are perpendicular to the side 30a on the terminal portion 11 side. However, in the ninth embodiment, as shown in FIG. 14, the common transfer terminal portions 20 are formed along a part of the three sides 30b, 30c, 30d of the sealing member 30, other than the side 30a on the terminal portion 11 side.

That is, as in the first embodiment, the three sides 30b, 30c, 30d of the sealing member 30, other than the side (the lower side in FIG. 14) 30a on the terminal portion 11 side, are formed on the outer edge of the TFT substrate 10. The common transfer terminal portions 20 are formed also along a part of the side 30b of the sealing member 30, which faces the side 30a on the terminal portion 11 side. Two common transfer terminal portions 20 are respectively formed along a part of both ends (the left and right end in FIG. 14) of the side 30b of the sealing member 30. Thus, the common transfer terminal portions 20 are formed along a part of the sealing member 30, other than the corners of the sealing member 30 located on the terminal portion 11 side. The structure is otherwise similar to that of the seventh embodiment.

Effects of the Ninth Embodiment

Thus, according to the ninth embodiment as well, the three sides 30b, 30c, 30d of the sealing member 30 are formed on the outer edge of the TFT substrate 10, and the common transfer terminal portions 20 are formed along a part of the sealing member 30 fanned on the outer edge of the TFT substrate 10, where the common transfer terminal portions 20 are formed along a part of the sealing member 30, other than the corners of the sealing member 30 located on the terminal portion 11 side. As a result, effects similar to those of the fifth embodiment can be obtained.

Tenth Embodiment

Figure 15:
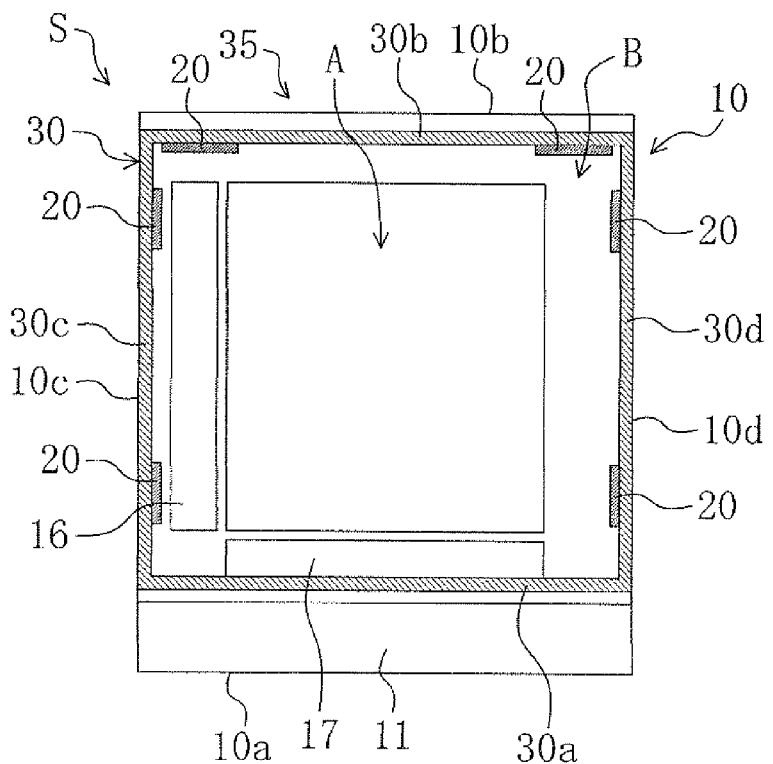
FIG. 15 is a schematic plan view of an LCD of a tenth embodiment.

FIG. 15 shows a tenth embodiment of the present invention. FIG. 15 is a schematic plan view of an LCD S. Note that, as in FIG. 1, the counter substrate 40 is not shown in FIG. 15.

In the ninth embodiment, the three sides 30b, 30c, 30d of the sealing member 30, other than the side 30a on the terminal portion 11 side, are formed on the outer edge of the TFT substrate 10. However, in the tenth embodiment, as shown in FIG. 15, only the two sides 30c, 30d of the sealing member 30 are formed on the outer edge of the TFT substrate 10. The structure is otherwise similar to that of the ninth embodiment.

Effects of the Tenth Embodiment

Thus, according to the tenth embodiment as well, the two sides 30c, 30d of the sealing member 30 are formed on the outer edge of the TFT substrate 10, and the common transfer terminal portions 20 are formed along a part of the sealing member 30 formed on the outer edge of the TFT substrate 10, where the common transfer terminal portions 20 are formed along a part of the sealing member 30, other than the corners of the sealing member 30 located on the terminal portion 11 side. As a result, effects similar to those of the sixth embodiment can be obtained.

Eleventh Embodiment

Figure 16:
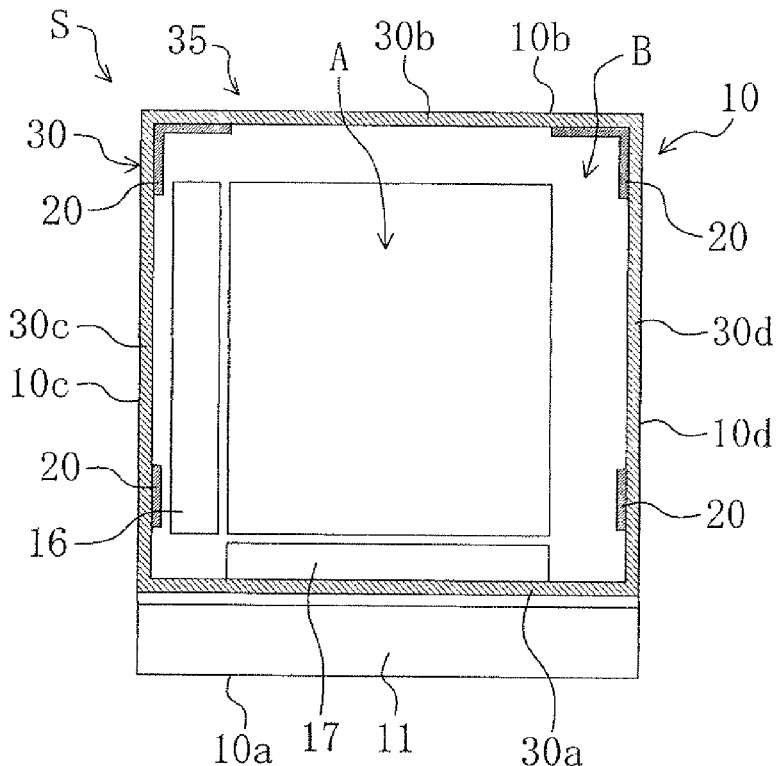
FIG. 16 is a schematic plan view of an LCD of an eleventh embodiment.

FIG. 16 shows an eleventh embodiment of the present invention. FIG. 16 is a schematic plan view of an LCD S. Note that, as in FIG. 1, the counter substrate 40 is not shown in FIG. 16.

In the eleventh embodiment, as shown in FIG. 16, the common transfer terminal portions 20 are respectively formed along the corners of the sealing member 30, which are located on the side opposite to the terminal portion 11 in the TFT substrate 10.

As in the first embodiment, the three sides 30b, 30c, 30d of the sealing member 30, other than the side (the lower side in FIG. 16) 30a on the terminal portion 11 side, are fanned on the outer edge of the TFT substrate 10. Moreover, the common transfer terminal portions 20 are formed along the ends of the source driver portion 16, which are located on the terminal portion 11 side, and the common transfer terminal portions 20 having a substantially L shape are further formed along the sealing member 30 at both corners of the sealing member 30, which are located on the side opposite to the terminal portion 11 in the TFT substrate 10.

Effects of the Eleventh Embodiment

Thus, according to the eleventh embodiment as well, the three sides 30b, 30c, 30d of the sealing member 30 are formed on the outer edge of the TFT substrate 10, and the common transfer terminal portions 20 are formed along a part of the sealing member 30 formed on the outer edge of the TFT substrate 10, where the common transfer terminal portions 20 are formed along a part of the sealing member 30, other than the corners of the sealing member 30 located on the terminal portion 11 side. As a result, effects similar to those of the fifth embodiment can be obtained.

Twelfth Embodiment

Figure 17:
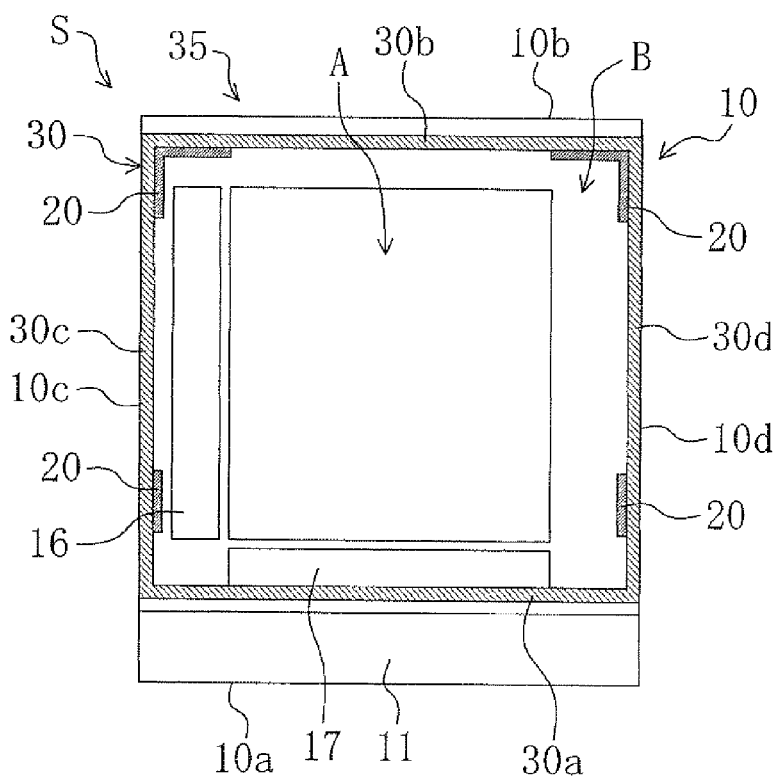
FIG. 17 is a schematic plan view of an LCD of a twelfth embodiment.

FIG. 17 shows a twelfth embodiment of the present invention. FIG. 17 is a schematic plan view of an LCD S. Note that, as in FIG. 1, the counter substrate 40 is not shown in FIG. 17.

In the eleventh embodiment, the three sides 30b, 30c, 30d of the sealing member 30, other than the side 30a on the terminal portion 11 side, are formed on the outer edge of the TFT substrate 10. However, in the twelfth embodiment, as shown in FIG. 17, only the two sides 30c, 30d of the sealing member 30 are formed on the outer edge of the TFT substrate 10. The structure is otherwise similar to that of the eleventh embodiment.

Effects of the Twelfth Embodiment

Thus, according to the twelfth embodiment as well, the two sides 30c, 30d of the sealing member 30 are formed on the outer edge of the TFT substrate 10, and the common transfer terminal portions 20 are formed along a part of the sealing member 30 formed on the outer edge of the TFT substrate 10, where the common transfer terminal portions 20 are formed along a part of the sealing member 30, other than the corners of the sealing member 30 located on the terminal portion 11 side. As a result, effects similar to those of the sixth embodiment can be obtained.

Thirteenth Embodiment

Figure 18:
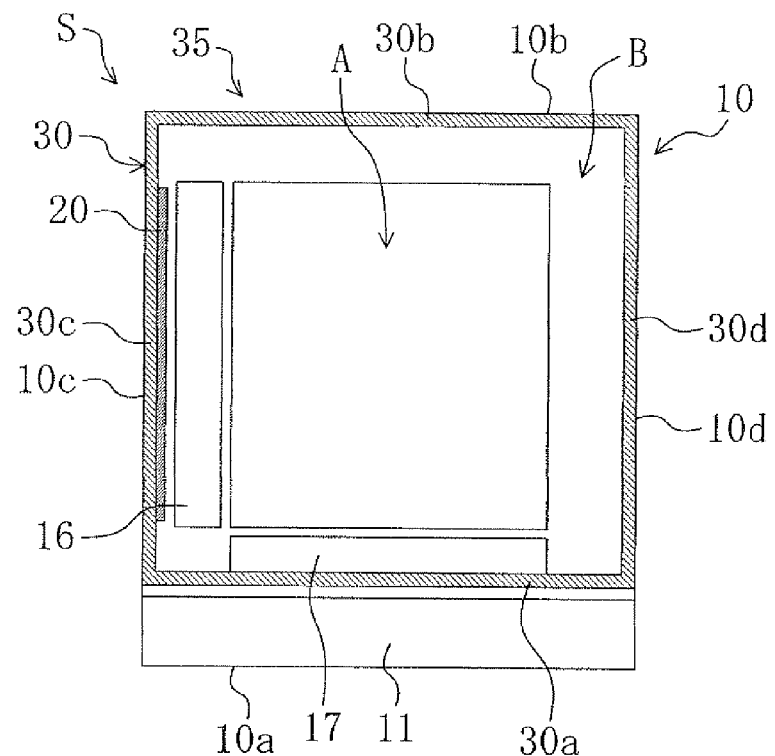
FIG. 18 is a schematic plan view of an LCD of a thirteenth embodiment.

FIG. 18 shows a thirteenth embodiment of the present invention. FIG. 18 is a schematic plan view of an LCD S. Note that, as in FIG. 1, the counter substrate 40 is not shown in FIG. 18.

In the fifth embodiment, the common transfer terminal portions 20 are formed along a part of the two sides 30c, 30d of the sealing member 30. However, in the thirteenth embodiment, as shown in FIG. 18, the common transfer terminal portion 20 is formed along only a part of the side (the left side in FIG. 18) 30c of the sealing member 30, which is perpendicular to the side 30a on the terminal portion 11 side.

Effects of the Thirteenth Embodiment

Thus, according to the thirteenth embodiment as well, the three sides 30b, 30c, 30d of the sealing member 30 are formed on the outer edge of the TFT substrate 10, and the common transfer terminal portion 20 is formed along a part of the sealing member 30 formed on the outer edge of the TFT substrate 10, where the common transfer terminal portion 20 is formed along a part of the sealing member 30, other than the corners of the sealing member 30 located on the terminal portion 11 side. As a result, effects similar to those of the fifth embodiment can be obtained.

Fourteenth Embodiment

Figure 19:
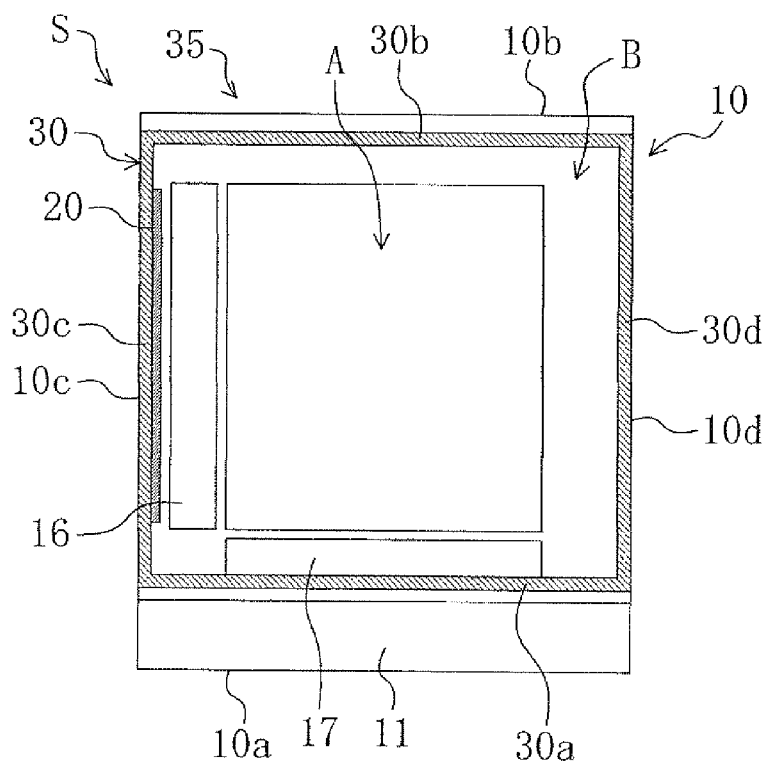
FIG. 19 is a schematic plan view of an LCD of a fourteenth embodiment.
Figure 20:
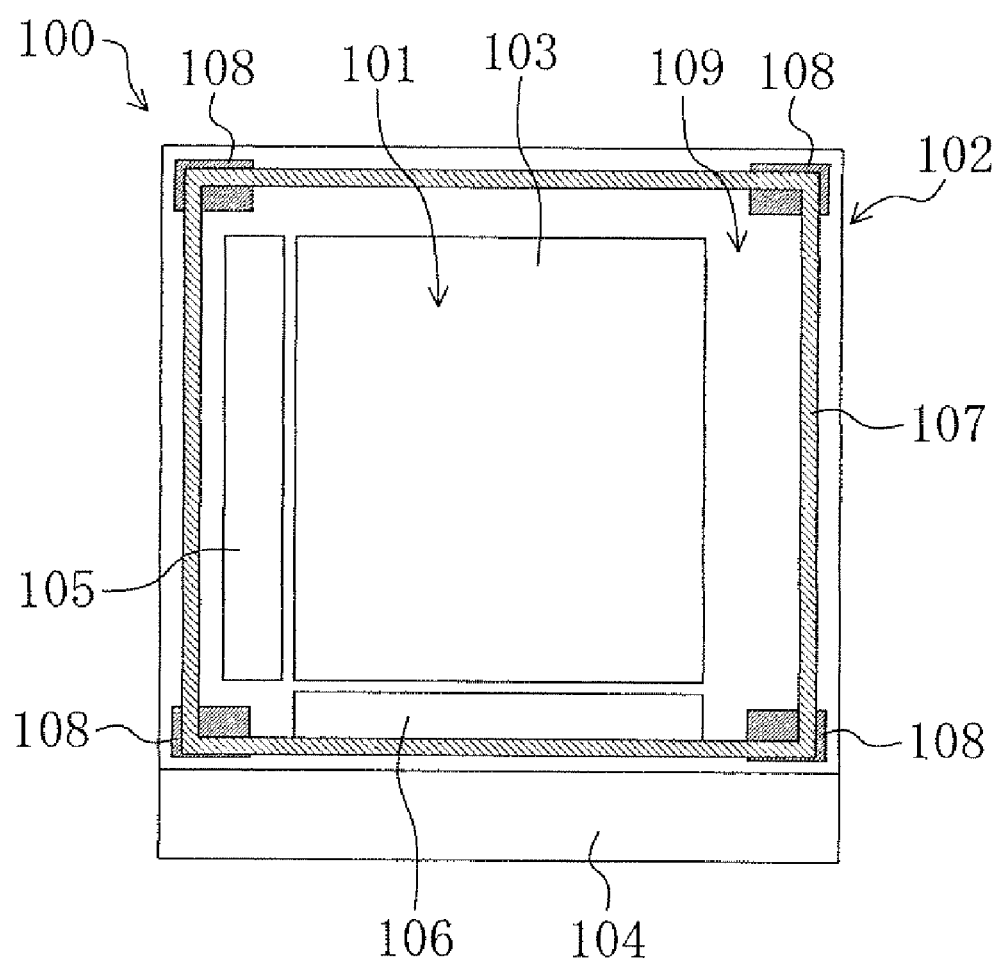
FIG. 20 is a schematic plan view of a conventional LCD.

FIG. 19 shows a fourteenth embodiment of the present invention. FIG. 19 is a schematic plan view of an LCD S. Note that, as in FIG. 1, the counter substrate 40 is not shown in FIG. 19.

In the thirteenth embodiment, the three sides 30b, 30c, 30d of the sealing member 30, other than the side 30a on the terminal portion 11 side, are formed on the outer edge of the TFT substrate 10. However, in the fourteenth embodiment, as shown in FIG. 19, only the two sides 30c, 30d of the sealing member 30 are formed on the outer edge of the TFT substrate 10. The structure is otherwise similar to that of the thirteenth embodiment.

Effects of the Fourteenth Embodiment

Thus, according to the fourteenth embodiment as well, the two sides 30c, 30d of the sealing member 30 are formed on the outer edge of the TFT substrate 10, and the common transfer terminal portion 20 is formed along a part of the sealing member 30 formed on the outer edge of the TFT substrate 10, where the common transfer terminal portion 20 is formed along a part of the sealing member 30, other than the corners of the sealing member 30 located on the terminal portion 11 side. As a result, effects similar to those of the sixth embodiment can be obtained.

Other Embodiments

In the first through fourteenth embodiments, the two sides 30c, 30d or the three sides 30b, 30c, 30d of the sealing member 30 are formed on the outer edge of the TFT substrate 10. However, the present invention is not limited to this. Only one side of the sealing member 30 may be formed on the outer edge of the TFT substrate 10, and at least one side of the sealing member 30 need only be formed on the outer edge of the TFT substrate 10.

INDUSTRIAL APPLICABILITY

As described above, the present invention is useful for LCDs, and is especially suitable for reducing the proportion of a frame portion in an entire LCD, and improving the display quality.

The invention claimed is:

1. A liquid crystal display, comprising:
   a rectangular first substrate;
   a rectangular second substrate positioned so as to face the first substrate;
   a liquid crystal layer sealed between the first substrate and the second substrate by a rectangular frame-shaped sealing member containing conductive particles;
   a terminal portion formed outside the sealing member in the first substrate, for applying a voltage to the liquid crystal layer;
   a first electrode layer formed on a surface located inside the sealing member in the first substrate, and electrically connected to the terminal portion;
   a common transfer terminal portion overlapping with the sealing member and electrically connected to the terminal portion, and being in contact with the conductive particles; and
   a second electrode layer formed in the second substrate, positioned so as to face the first electrode layer, and electrically connected to the terminal portion through the conductive particles and the common transfer terminal portion, where
   interconnect layers are formed at least one of four corners inside the sealing member, wherein
   at least one side of the sealing member is formed on an outer edge of the first substrate along at least one side of the display so that neither the first substrate nor the second substrate extends beyond an outer periphery of the sealing member along said side of the display, and
   the common transfer terminal portion is formed along at least a part of the sealing member formed on the outer edge of the first substrate.

2. The liquid crystal display of claim 1, wherein two sides of the sealing member, which extend perpendicularly to one side on the terminal portion side, are farmed on the outer edge of the first substrate.

3. The liquid crystal display of claim 1, wherein one side of the sealing member, which faces a side on the terminal portion side, and two sides of the sealing member, which extend perpendicularly to the side on the terminal portion side, are formed on the outer edge of the first substrate.

4. The liquid crystal display of claim 1, wherein the common transfer terminal portion is formed along an entire length of the sealing member formed on the outer edge of the first substrate.

5. The liquid crystal display of claim 1, wherein the common transfer terminal portion is formed along at least a part of the sealing member other than corners of the sealing member, which are located on the terminal portion side.

* * * * *